Patented Jan. 19, 1937

2,068,312

UNITED STATES PATENT OFFICE 2,068,312

HALOGEN-AMINO-FLAVANTHRONES AND PROCESS OF PRODUCING THE SAME

William Dettwyler, Milwaukee, Wis., assignor to E. I. du Pont de Nemours & Company, Wilmington, Del., a corporation of Delaware No Drawing. Original application May 24, 1933, Serial No. 672,641. Divided and this application October 21, 1935, Serial No. 45,969

5 Claims. (Cl. 260—42)

This invention relates to the preparation of new and valuable compounds of the anthraquinone series and more particularly to the preparation of $\alpha,\alpha$-dichloro-$\beta,\beta$-diamino flavanthrone. This application is a division of U. S. application Ser. No. 672,641 filed May 24, 1933.

It is an object of this invention to prepare new and useful dyestuff intermediates of the anthraquinone series which have been found to be particularly useful in the preparation of flavanthrone dithiazoles, although their use is obviously not limited thereto.

In carrying out my invention I condense an $\alpha,\alpha$-dihalogen-$\beta,\beta$-diacylamino-anthraquinone, such as for example 1,5,2,6- or 1,8,2,7-dihalogen-dibenzoylamino-anthraquinone by the aid of a copper catalyst to the corresponding dihalogen-tetrabenzoylamino-1,1'-dianthraquinonyl. This compound is then subjected to simultaneous hydrolysis and ring-closure to give $\alpha,\alpha'$-dihalogen-$\beta,\beta'$-diamino-flavanthrone in which each amino group is situated in ortho position to the halogen atom. This compound is adapted to form the flavanthrone-dithiazole by fusion with sulfur or a compound that will react with ortho-amino-aryl-mercaptans to form thiazole rings such as more particularly described in the parent application referred to above.

Without limiting my invention to any particular procedure, the following examples are given to illustrate my specific mode of operation. Parts mentioned are by weight.

Step 1—Preparation of the initial material 750 parts of dry nitrobenzene and 75 parts of 1,5-dichloro-2,6-diamino-anthraquinone are heated together to 170° C. and to this solution 75 parts of benzoyl chloride are added slowly, while maintaining a uniform temperature. The mass is then heated to 190° C. and held at this temperature for two hours. The 1,5-dichloro-2,6-di(benzoylamino)-anthraquinone thus produced crystallizes out in yellow needles. The charge is then cooled to 30–40° C. and filtered, and the cake is washed with nitro-benzene and alcohol, and finally dried in the usual manner.

Step 2—Preparation of the first intermediate 800 parts of dry nitrobenzene, 100 parts of 1,5-dichloro-2,6-dibenzoyl-diamino-anthraquinone, 40 parts of copper powder, and 2 parts of soda ash are heated together to reflux temperature and held at this temperature about 20 hours. The color of the suspension changes from yellow to olive. The mass is now cooled to 20° C., and filtered. The filter cake is washed successively with nitrobenzene, alcohol, and hot water. The wet cake is suspended in 1000 parts of water, 100 parts of concentrated sulfuric acid and 50 parts of common salt are added, and the mass is warmed to 50° C. About 20 parts of sodium chlorate are then added gradually, until a distinct excess of chlorine is produced. After a further half hour at this temperature, the mass is filtered, and the filter cake is washed free of acid and dried as usual. The product is most probably 5,5'-dichloro-2,6,2',6'-tetrabenzoyl-tetramino-1,1'-dianthraquinonyl, of the formula:

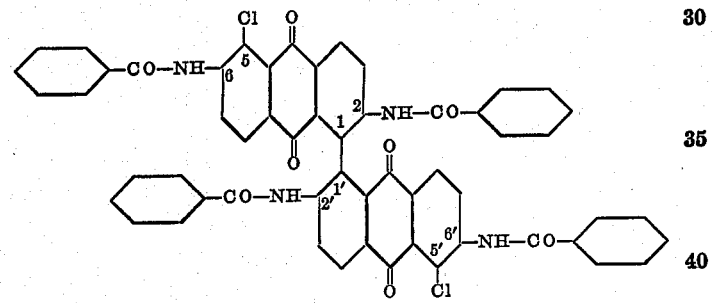

In dry state it has the form of short olive needles, practically insoluble in nitrobenzene, but soluble in concentrated sulfuric acid with a greenish-yellow color.

Step 3—Ring-closure to a flavanthrone body 80 parts of 5,5'-dichloro-2,6,2',6'-tetrabenzoyl-tetramino-1,1'-dianthraquinonyl are suspended in 800 parts of sulfuric acid, and heated to 85–90° C. until uniformly dispersed. The solution is then held at this temperature for two hours, after which time the hydrolysis and ring-closure is complete. The mass is then cooled to 20° C., poured into water, filtered, and washed acid free and dried. The product is most probably 5,5'-dichloro-6,6'-diamino-flavanthrone of the formula:

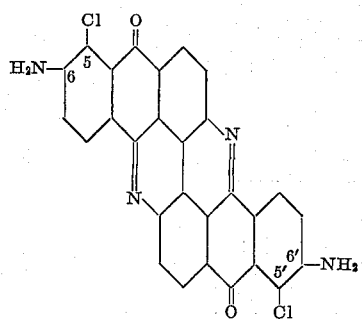

It is a brown powder, insoluble at room temperature in most organic solvents, but soluble in concentrated sulfuric acid with a greenish yellow color.

If in place of 1,5-dichloro-2,6-diamino-anthraquinone one starts with 1,8-dichloro-2,7-diamino-anthraquinone, isomeric intermediates are obtained which have similar properties to those described in the specific examples. One may also start with other dichloro-diacidylamino-anthraquinones, such as for example 1,5-dichloro-2,6-diacetyl-diamino-anthraquinone which may be prepared in known manner from 1,5-dichloro-2,6-diamino-anthraquinone and acetic anhydride. The resulting 5,5'-dichloro-2,6,2',6'-tetraacetyl-tetramino-1,1'-dianthraquinonyl is very similar in physical properties to the tetrabenzoyl derivative and may be subjected to ring-closure in the same manner as above described to give compounds identical with those obtained using the benzoylamino compound.

It will be understood that many other variations and modifications are possible in my preferred procedure without departing from the spirit of this invention.

I claim:

1. The process which comprises heating an α,α-dihalogen-tetra-β-acylamino-1,1'-dianthraquinonyl in which one acylamino group is attached to each anthraquinone molecule ortho to the dianthraquinonyl linkage, and in which one halogen and one acylamino group are attached in ortho position to each other in the benzene ring of each anthraquinone molecule remote from the dianthraquinonyl linkage in sulfuric acid, whereby to form an α,α-dihalogen-β,β'-diamino-flavanthrone.

2. The process which comprises heating a 5,5'-dichloro-2,6,2',6'-tetraacyl-tetramino-1,1'-dianthraquinonyl in sulfuric acid, whereby to form a 5,5'-dichloro-6,6'-diamino-flavanthrone.

3. The process which comprises heating a 5,5'-dichloro-2,6,2',6'-tetrabenzoyl-tetraacyl-tetramino-1,1'-dianthraquinonyl in sulfuric acid, whereby to form a 5,5'-dichloro-6,6'-diamino-flavanthrone.

4. An α,α-dihalogen-β,β'-diamino-flavanthrone in which an amino group and a halogen atom are attached in ortho position to each other in each of the benzene rings of the anthraquinone nuclei that is not linked directly to the heterocyclic rings of the flavanthrone molecule.

5. 5,5'-dichloro-6,6'-diamino-flavanthrone.

WILLIAM DETTWYLER.